US005652278A

United States Patent [19]

Barker et al.

[11] Patent Number: 5,652,278
[45] Date of Patent: Jul. 29, 1997

[54] MICROVOID POLYURETHANE MATERIALS

[75] Inventors: Martin Barker, Everberg; Alain Luc Raymonde Marie Paul Herssens, Wilrijk; Norman Washington Keane, Kraainem; Guy Leon Jena Ghislain Biesmans, Everberg; Karen Liliane Jean Van Der Sande, Berg, all of Belgium

[73] Assignee: Imperial Chemical Industries PLC, London, England

[21] Appl. No.: 239,630

[22] Filed: May 9, 1994

Related U.S. Application Data

[63] Continuation-in-part of Ser. No. 100,025, Jul. 30, 1993, abandoned.

[30] Foreign Application Priority Data

Jun. 22, 1993 [GB] United Kingdom .................. 9312868

[51] Int. Cl.$^6$ ............................................. C08G 18/04
[52] U.S. Cl. ........................... 521/155; 521/131; 521/137
[58] Field of Search ................................. 521/131, 137, 521/155

[56] References Cited

U.S. PATENT DOCUMENTS

| | | |
|---|---|---|
| 3,574,150 | 4/1971 | Jefferson et al. . |
| 3,582,396 | 6/1971 | Konig et al. . |
| 3,666,542 | 5/1972 | Kigane et al. . |
| 4,000,246 | 12/1976 | Walles . |
| 4,444,821 | 4/1984 | Young et al. ............................... 428/69 |
| 4,510,186 | 4/1985 | Kuriyama et al. . |
| 4,663,551 | 5/1987 | Weh et al. . |
| 4,668,551 | 5/1987 | Kawasaki et al. ......................... 428/69 |
| 4,668,555 | 5/1987 | Uekado et al. ............................ 428/69 |
| 4,702,963 | 10/1987 | Phillips et al. ............................ 428/426 |
| 4,726,974 | 2/1988 | Nowobilski et al. ...................... 428/69 |
| 4,746,684 | 5/1988 | Kuriyama et al. ....................... 521/137 |
| 5,032,439 | 7/1991 | Glicksman et al. ....................... 428/44 |
| 5,032,623 | 7/1991 | Keske et al. ............................. 521/131 |
| 5,066,437 | 11/1991 | Barito et al. ............................. 264/46.5 |
| 5,076,984 | 12/1991 | Bisplinghoff et al. .................... 264/102 |
| 5,082,335 | 1/1992 | Cur et al. . |
| 5,084,320 | 1/1992 | Barito et al. ............................. 428/69 |
| 5,091,233 | 2/1992 | Kirby et al. .............................. 428/69 |
| 5,484,818 | 1/1996 | DeVos et al. ............................ 521/155 |

FOREIGN PATENT DOCUMENTS

| | | |
|---|---|---|
| 0498628 | 8/1992 | European Pat. Off. . |
| 57-133870 | 8/1982 | Japan . |
| 95/02009 | 1/1995 | WIPO . |

OTHER PUBLICATIONS

Kistler, S. S., "The Relation Between Heat Conductivity and Structure in Silica Aerogel", *Journal of Physical Chemistry*, vol. 39 (1935), pp. 79–85, Jun. 14, 1934.

Strong, H. M. et al, "Flat Panel Vacuum Thermal Insulation", *Journal of Applied Physics*, vol. 31, No. 1, pp. 39–50 (Jan. 1960).

*Primary Examiner*—James J. Seidleck
*Assistant Examiner*—John M. Cooney, Jr.

[57] ABSTRACT

Microvoid polyurethane materials having densities below 300 kg/m$^3$ and void sizes below 5 micron which are suitable for use as insulating filler in evacuated insulation panels.

8 Claims, 8 Drawing Sheets

MICROVOID POLYURETHANE MATERIALS

CROSS-REFERENCE TO RELATED APPLICATION

The present application is a continuation-in-part of U.S. patent application Ser. No. 08/100,025, filed Jul. 30, 1993, entitled "Microvoid Polyurethane Materials" which is now abandoned.

DESCRIPTION

The present invention relates to microvoid polyurethane materials and to their use in evacuated insulation panels.

Evacuated insulation panels having a reduced internal pressure are known for various uses including use in refrigeration appliances where they greatly enhance the degree of thermal insulation within the cabinet of the appliance. Such panels must remain effective for the life of the appliance, generally a period in excess of 20 years.

Such evacuated insulation panels generally comprise a low thermal conductivity filler material and a vessel formed of a gastight film enveloping said filler, the whole being evacuated to an internal pressure of about 5 mbar or less and then hermetically sealed. Besides insulation the filler has also the function of supporting the skin of the vessel so that it does not collapse when it is evacuated.

Known filler materials for use in such evacuated insulation panels include finely divided inorganic powders such as fumed silica, silica dust, precipitated silica, precipitated silica/fly ash mixtures, alumina, fine perlite and fiberglass and organic foamed materials. For example it has been proposed to use rigid polyurethane foam having open cells as the core material in evacuated insulation panels (see, for example, Japanese Patent Application Kokai No. 133870/82, U.S. Pat. No. 4,668,555 and European Patent Publication No. 498628).

The pressure level to which the vessel is evacuated is related to the thermal conductivity of the resulting panel such that generally the lower the pressure the lower the thermal conductivity. Further the pressure level depends on the specific filler insulation material. Preferably the vessel is evacuated to a pressure level of between approximately 1 and 10 mbar.

A disadvantage of using rigid open celled polyurethane foam as the core material in evacuated insulation panels is that the thermal conductivity does not become sufficiently low and hence an excellent heat insulating property cannot be obtained unless the internal pressure is reduced to 1 mbar or less. The management of a low pressure of 1 mbar or less in an industrial setting is difficult. This can cause in large scale production such problems as the necessity of large equipment and a prolonged evacuation time which results in a poor efficiency in mass production.

Even when the evacuated insulation panel initially has an excellent low thermal conductivity its internal pressure increases with time owing to gases such as air and water vapor gradually diffusing in and to organic gases evolving gradually (from inside of the resin forming the rigid polyurethane foam) which results in the deterioration of the heat insulating property of the evacuated insulation panel.

The extent of increase in thermal conductivity with internal pressure increase again depends on the type of filler insulation material used in the evacuated insulation panel. When open celled polyurethane foam is used as filler material in evacuated insulation panels the thermal conductivity increases rapidly when the internal pressure increases, especially at pressures above 0.1 mbar.

This means that evacuated insulation panels filled with open celled polyurethane foam not only have to be evacuated to pressures below 1 mbar to obtain a satisfactory initial heat insulation property but also that the heat insulation property of such an evacuated insulation panel rapidly degrades with lapse of time as the degree of vacuum degrades.

It is an object of the present invention to provide a novel polyurethane material that can be used as a filler in evacuated insulation panels.

It is another object of the present invention to provide a method of manufacturing said polyurethane material.

It is still another object of the present invention to provide an evacuated insulation panel filled with a polyurethane material not showing the disadvantages mentioned above for evacuated insulation panels filled with open celled polyurethane foam.

It is still another object of the present invention to provide an evacuated insulation panel filled with a polyurethane material showing an excellent heat insulating property at pressures up to 10 mbar.

It is still another object of the present invention to provide an evacuated insulation panel filled with a polyurethane material having excellent heat insulating property at a low degree of vacuum which can be easily produced in industrial operation thus reducing both the time necessary for evacuation and also facilitating mass production.

It is still another object of the present invention to provide an evacuated insulation panel filled with a polyurethane material maintaining a satisfactory heat insulating property over a long period of time thus securing reliability of performance.

According to the present invention a microvoid polyurethane material is provided, said microvoid polyurethane material yielding at a pressure of 10 mbar a thermal conductivity at 10° C. of at the most 23 mW/m° K. (lambda value).

BRIEF DESCRIPTION OF THE DRAWINGS

FIG. 10b is an expansion of the 0–25 mbar region of the curves shown in FIG. 10a.

Figure 1:
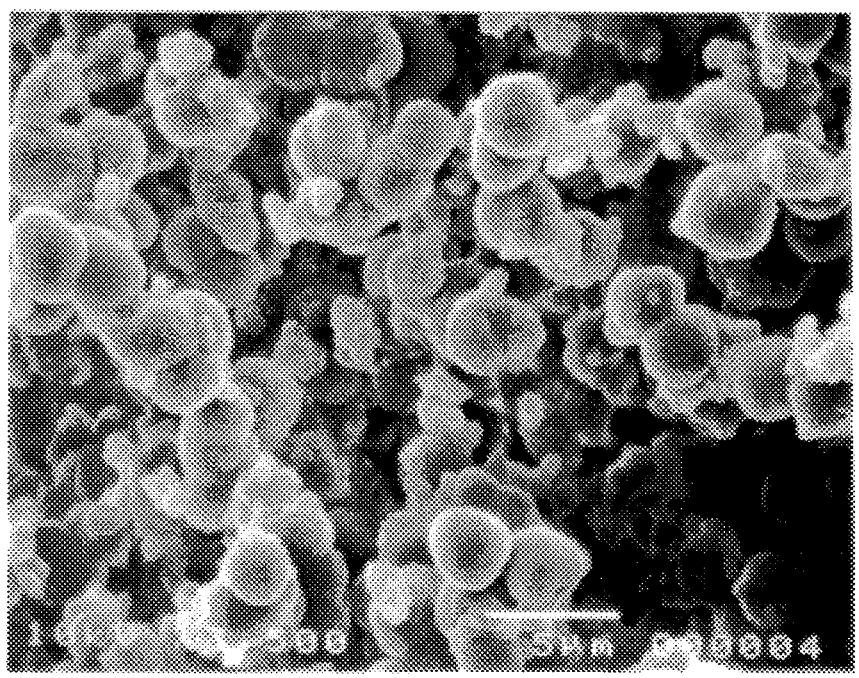
FIGS. 1–9 show scanning electron microscope photos of the samples described in Examples 1 to 6.

The term "polyurethane" as used in defining the present invention is to be understood as including polyurethane, polyisocyanurate, urethane-modified polyisocyanurate, polyurea and urethane-modified polyurea.

Preferably the microvoid polyurethane material according to the present invention yields at a pressure of 10 mbar a thermal conductivity at 10° C. of at the most 20 mW/m° K., more preferably at the most 18 mW/m° K., even more preferably at the most 15 mW/m° K. and most preferably at the most 12 mW/m° K.

Preferably the microvoid polyurethane material according to the present invention also yields at a pressure of 20 mbar a thermal conductivity at 10° C. of at the most 27 mW/m° K., more preferably at the most 25 mW/m° K., even more preferably at the most 21 mW/m° K. or 18 mW/m° K. and most preferably at the most 14 mW/m° K.

The thermal conductivities at 10° C. of the microvoid polyurethane material according to the present invention at the specified pressures is measured by filling a gastight envelope with said material, evacuating the whole to the specified pressure, placing the thus obtained sample between a cold plate at −5° C. and a hot plate at 25° C. and measuring the heat flux through the sample. Alternatively the hot and cold plate arrangement together with a sample of the microvoid polyurethane material can be placed in a dedicated vacuum chamber evacuated to the desired pressure.

The microvoid polyurethane materials according to the present invention generally yield thermal conductivities at 10° C. of about 10 mW/m° K. at pressures up to 1 mbar. At pressures up to 1 mbar the thermal conductivity of these materials is almost independent of pressure. At pressures above 1 mbar the thermal conductivity becomes proportional to the pressure. The pressure at which this transition from pressure independent to pressure dependent occurs is called hereinafter the critical pressure; the critical pressure is determined as the intersection of the flat line representing the pressure independent region and of the tangent line of the starting pressure dependent region (i.e. where the curve begins to deviate strongly from a flat line) in a log diagram of lambda value versus pressure. The higher the critical pressure the longer an evacuated insulation panel will retain its initial thermal insulation property as the degree of vacuum degrades.

Critical pressures for the microvoid polyurethane materials according to the present invention are generally above 0.1 mbar, preferably above 0.5 mbar, more preferably above 1 mbar, even more preferably above 3 mbar and most preferably above 4 mbar.

Thus generally the microvoid polyurethane materials according to the present invention show a thermal conductivity at 10° C. of 15 mW/m° K. at a pressure above 2 mbar, preferably above 5 mbar, more preferably above 10 mbar and most preferably above 30 mbar and show a thermal conductivity at 10° C. of 20 mW/m° K. at a pressure above 4 mbar, preferably above 10 mbar, more preferably above 40 mbar and most preferably above 100 mbar.

The microvoid polyurethane materials according to the present invention generally have densities under vacuum conditions of below 300 kg/m$^3$, preferably below 250 kg/m$^3$, more preferably below 200 kg/m$^3$ and still more preferably below 150 kg/m$^3$. These densities are obtained by measuring the weight and volume of a compressed evacuated sample.

Further the microvoid polyurethane materials according to the present invention generally have mean void sizes of below 5 micron, preferably below 2 micron and more preferably below 1 micron.

The mean void size of the polyurethane materials of the present invention can be deducted from their lambda/pressure behaviour as described by H. M. Strong, F. P. Bundy and H. P. Bovenkerk in Journal of Applied Physics, Volume 31, Number 1, 1960, pages 39 to 50 and by S. S. Kistler in Journal of Physical Chemistry, Volume 39, 1935, pages 79 to 85.

Further the microvoid polyurethane materials according to the present invention generally have surface areas of more than 1 m$^2$/g, preferably more than 5 m$^2$/g, more preferably more than 50 m$^2$/g and most preferably more than 100 m$^2$/g.

The surface area can be measured using the standard BET method as described by A. W. Adamson in "Physical Chemistry of Surfaces", Pub. Interscience, 2nd Edition, 1967, Chapter XIII. Modifications of the BET procedure can be made to give estimates of mean void sizes (also described in the above reference).

Surface areas and mean void sizes can also be measured using mercury porosimetry as described by A. W. Adamson in "Physical Chemistry of Surfaces", Pub. Interscience, 2nd Edition, 1967, Chapter XII.

There are several methods of making the microvoid polyurethane materials according to the present invention.

One of these methods is a solvent precipitation method involving mixing solutions of polyol and polyisocyanate in solvent in the presence of a rheological modifier (for example an organoclay) such that the polyurethane formed precipitates out as small beads, allowing these polyurethane beads to gel to form a three-dimensional crosslinked network and evaporating the solvent.

Therefore the present invention also provides a method for making microvoid polyurethane materials comprising the steps of a) preparing separate solutions of polyurethane-forming reactants in inert organic liquid diluents which form a homogeneous mixture in which the polyurethane produced herewith is substantially insoluble, b) mixing the solutions to yield a homogeneous mixture of the reactants and ceasing said mixing before the onset of gelation, c) thereafter maintaining said mixture in a quiescent state while the polyurethane solution gels, and d) removing said organic liquid, characterised in that at least one of the polyurethane-forming reactant solutions contains a rheological modifier.

By this solvent precipitation method agglomerated polyurethane beads are obtained with bead sizes in the range 0.1 to 5 micron, mostly in the range 0.7 to 3 micron.

This method differs from known solvent precipitation methods (as described in U.S. Pat. No. 3,574,150) in the addition of a rheological modifier. By adding a rheological modifier significant improvements are obtained in both bead size and void size of the thus obtained microvoid polyurethane material at low density (densities under vacuum of below 200 kg/m$^3$) and in sample homogeneity. Densities under vacuum of below 200 kg/m$^3$ together with bead sizes of below 5 micron and void sizes of below 10 micron are necessary for this material to be useful as insulating filler in evacuated insulation panels. Polyurethane materials described in U.S. Pat. No. 3,574,150 made according to the solvent precipitation method described therein do not possess all of these properties and therefore are not useful as insulating filler in evacuated insulation panels. Either the bead size is small enough but then the density is too high (about 210 kg/m$^3$ under atmospheric pressure which would correspond to a density of about 230 to 240 kg/m$^3$ under vacuum) or the density is low enough but then the bead size is too large (about 5 micron). U.S. Pat. No. 3,574,150 describes these materials for use as filters and not as insulating filler for evacuated insulation panels.

Examples of useful rheological modifiers are organoclay and fumed silica.

The rheological modifier is added in amounts ranging from 0.1 to 2% by weight based on the total reaction mixture and preferably in amounts of about 1% by weight based on the total reaction mixture. The rheological modifier is preferably added to the polyol solution prior to mixing with the polyisocyanate solution. High speed mixing is used to obtain a good dispersion of the rheological modifier in the polyol solution.

Apart from the addition of a rheological modifier the solvent precipitation method of the present invention is carried out along the lines described in U.S. Pat. No. 3,574,150 which is incorporated herein by reference.

The organic liquid diluent must serve as a non-solvent for the polyurethane product and must be unreactive towards polyisocyanates and polyols. Suitable organic liquid diluents for use in the solvent precipitation method according to the present invention include toluene and the solvents listed in U.S. Pat. No. 3,574,150. Lower boiling organic compounds are preferred since they can be readily removed by evaporation.

Single liquids may be used or mixtures of liquids.

For simplicity it is desirable that the organic liquid diluent be a solvent for both types of reactants. The same liquid may then be used for both reactants.

A preferred solvent is toluene.

Polyisocyanates for use in the solvent precipitation method according to the present invention include aliphatic, clycloaliphatic, araliphatic and aromatic polyisocyanates as proposed in the literature for use generally in the production of polyurethane materials. Of particular importance are aromatic diisocyanates such as tolylene and diphenylmethane diisocyanate in the well known pure, modified and crude forms, in particular diphenylmethane diisocyanate (MDI) in the form of its 2,4'-, 2,2'- and 4,4'-isomers (pure MDI) and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2 and the so-called MDI variants (MDI modified by the introduction of urethane, allophanate, urea, biuret, carbodiimide, uretonimine or isocyanurate residues).

Polyols for use in the solvent precipitation method of the present invention include polyether reaction products of alkylene oxides, such as ethylene oxide and propylene oxide, with initiators containing from 2 to 8 active hydrogens per molecule. Suitable initiators include polyols, for example glycerol, trimethylolpropane, triethanolamine, pentaerythritol, sorbitol and sucrose; polyamines, for example ethylene diamine, diethylene triamine, tolylene diamine, diaminodiphenylmethane and polymethylene polyphenylene polyamines; and aminoalcohols, for example ethanolamine and diethanolamine; and mixtures of such initiators. Preferred initiators are the nitrogen-based initiators such as diethylene triamine and ethylene diamine.

Polyols for use in the solvent precipitation method according to the present invention preferably have a functionality of at least 3.

The concentration of reacting solids in the mixture is preferably between 5 and 25% by weight and preferably between 10 and 15% by weight; the lower concentrations yielding less dense products.

The ratio NCO/OH is preferably between 0.80 and 1.20.

In performing the solvent precipitation method according to the present invention catalysts and surfactants (such as a silicone surfactant) may be used as described in U.S. Pat. No. 3,574,150.

Further, infrared absorbers such as carbon black, metal flakes or iron oxides may be added in order to further reduce the thermal conductivity of the obtained polyurethane material.

The solvent precipitation method according to the present invention is preferably done at room temperature, although somewhat higher or lower temperatures may be employed.

Another improvement to the solvent precipitation method described in U.S. Pat. No. 3,574,150 involves using specific solvents namely chlorofluorocarbons and hydrochlorofluorocarbons in combination with surfactants.

Therefore the present invention also provides a method for making microvoid polyurethane materials comprising the steps of a) preparing separate solutions of polyurethane-forming reactants in inert organic liquid diluents which form a homogeneous mixture in which the polyurethane produced herewith is substantially insoluble, b) mixing the solutions to yield a homogeneous mixture of the reactants and ceasing said mixing before the onset of gelation, c) thereafter maintaining said mixture in a quiescent state while the polyurethane solution gels, and d) removing said organic liquid, characterised in that the inert organic liquid diluent comprises a chlorofluorocarbon or a hydrochlorofluorocarbon and that at least one of the polyurethane-forming reactant solutions contains a surfactant.

Not only are these solvents more convenient to work with (less flammable and less toxic than toluene, the preferred solvent described in U.S. Pat. No. 3,574,150) but also, in combination with surfactants, improvements are obtained in bead size of the obtained material at low densities.

Examples of suitable chlorofluorocarbon solvents include trichlorofluoromethane, dichlorodifluoromethane, trichlorotrifluoroethane and tetrafluorodichloroethane.

Examples of suitable hydrochlorofluorocarbon solvents include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Trichlorofluoromethane is particularly preferred.

A small amount of a co-solvent (such as toluene) may be added to the chlorofluorocarbon or hydrochlorofluorocarbon solvents used in the present solvent precipitation method.

Examples of suitable surfactants are silicone surfactants and polysiloxane-polyether blockcopolymers.

The surfactant is added in an amount ranging from 0.01 to 2% by weight, preferably between 0.05 and 0.2% by weight based on the total reaction mixture.

Another method of making the microvoid polyurethane materials according to the present invention is a flocculation method involving emulsifying a urethane-modified isocyanate-ended prepolymer in water, stirring the emulsion for a certain period of time, causing the emulsion to flocculate and drying the flocculated material.

Therefore the present invention also provides a method for making microvoid polyurethane materials comprising the steps of a) emulsifying a hydrophilic isocyanate-ended prepolymer composition in an agitated aqueous solution, b) stirring the emulsion for a certain period of time, c) causing the emulsion to flocculate, and d) drying the flocculated material.

By this flocculation method agglomerated urethane-modified polyurea beads are obtained with primary particle sizes in the range of 0.01 to 2 micron and mostly in the range of 0.05 to 0.2 micron. The size of the aggregated beads is in the range of 2 to 100 micron.

The hydrophilic isocyanate-ended prepolymer for use in the flocculation method of the present invention is the reaction product of a stoichiometric excess of a polyisocyanate and a hydrophilic polyoxyalkylated monol.

The present hydrophilic polyoxyalkylated monol has a cloud point of higher than 10° C., preferably higher than 20° C. and more preferably in the range of 50° C. to 100° C.

The cloud point is a measure of hydrophilicity, the higher the cloud point the more hydrophilic the monol.

The hydrophilic polyoxyalkylated monol generally corresponds to the formula R-A-OH, wherein R is $C_{1-8}$ alkyl, preferably $C_{1-5}$ alkyl and A is a polyoxyalkylene chain containing at least 25% polyoxyethylene units, preferably between 75 and 100% polyoxyethylene units, more preferably between 90 and 100% polyoxyethylene units and most preferably between 95 and 100% polyoxyethylene units. The term "alkyl" as used herein is to be understood to include within its meaning both straight and branched chain variants. Preferably A is a 100% polyoxyethylene chain.

The hydrophilic polyoxyalkylated monol preferably has a molecular weight in the range of 300 to 2000, more preferably in the range of 350 to 1500 and even more preferably in the range 350 to 1000.

The polyisocyanate for use in the preparation of the present hydrophilic isocyanate-ended prepolymer may be any organic polyisocyanate. Suitable materials include aromatic diisocyanates such as diphenylmethane diisocyanate in the form of its 2,4'-, 2,2'- and 4,4'-isomers and mixtures thereof, toluene diisocyanate in the form of its 2,4- and 2,6-isomers and mixtures thereof, 1,5-naphthalene diisocyanate and 1,4-diisocyanatobenzene, aliphatic diisocyanates such as isophorone diisocyanate, 1,6-diisocyanatohexane and 4,4'-diisocyanato dicyclohexylmethane. Polyisocyanates of particular importance for the preparation of the present prepolymer are the mixtures of diphenylmethane diisocyanates (MDI) and oligomers thereof known in the art as "crude" or polymeric MDI (polymethylene polyphenylene polyisocyanates) having an isocyanate functionality of greater than 2, preferably enriched with higher molecular weight polymeric species.

The hydrophilic isocyanate-ended prepolymers for use in the present flocculation method suitably have an isocyanate value (i.e. the weight percentage of reactive NCO groups) within the range 6 to 26. This generally corresponds to a weight ratio of polyisocyanate to polyoxyalkylated monol of between 95:5 to 25:75.

The hydrophilic isocyanate-ended prepolymers for use in the present flocculation method are prepared according to generally known methods. The reaction is preferably carried out by drip feeding the monol into the polyisocyanate at a temperature above the ambient, suitably within the range from 60° C. to 90° C., followed by a period of mixing at this elevated temperature to ensure complete reaction. The water content of the polyoxyalkylated monol should be low, preferably below 0.5% by weight. If necessary the monol is dried before prepolymerisation.

The hydrophilic isocyanate-ended prepolymer is emulsified in water with high shear mixing. The solids content of the obtained emulsion is less than 50% by weight, preferably between 2.5 and 10% by weight. But if desired the emulsion can be made at high solids concentrations (such as between 20 and 40% by weight) and diluted before flocculation takes place.

The emulsification can be carried out at room temperatures, but also lower temperatures (to about 0° C.) or higher temperatures can be used. The lower the emulsification temperature, the smaller the bead size becomes. In general if the hydrophilic isocyanate-ended prepolymer is derived from a polyoxyalkylated monol containing a 100% polyoxyethylene units, the emulsification is carried out at a temperature of between 0° and 90° C., preferably between 5° and 50° C. and most preferably between 5° and 25° C. and if the hydrophilic isocyanate-ended prepolymer is derived from a polyoxyalkylated monol containing about 75% polyoxyethylene units and 25% polyoxypropylene units, the emulsification is carried out at a temperature of between 5° and 40° C., preferably between 10° and 25° C.

Catalysts can be added either to the prepolymer composition or to the aqueous solution before emulsification.

Suitable catalysts include tertiary amines such as imidazoles, dimethylcyclohexylamine or triethylene diamine and metal carboxylates such as potassium acetate and potassium ethylhexoate.

Further, infrared absorbers such as carbon black, metal flakes or iron oxides may be added in order to further reduce the thermal conductivity of the obtained polyurethane material.

The emulsification step is followed by a period of mixing allowing reaction of the prepolymer with water. The period of mixing depends on the temperature and the amount of catalyst used. For example when the mixing is carried out at 50° C., 5 to 10 minutes of additional mixing will suffice; when the mixing is carried out at 20° C., 50 to 200 minutes of additional mixing may be necessary.

Thereafter the emulsion is flocculated. This can be done either by increasing the temperature above the cloud point of the monol used in the prepolymer preparation or by adding electrolytes or non-solvents (such as acetone).

Examples of suitable electrolytes are phosphates such as potassium phosphate, sulfates such as sodium sulfate and chlorides such as sodium chloride. Phosphates are particularly preferred. These electrolytes are usually added in amounts ranging from 0.1 to 5% by weight based on the weight of the emulsion and preferably in an amount of about 0.1 to 2% by weight, most preferably about 0.25% by weight.

A combination of adding electrolyte and increasing the temperature can also be used to flocculate the emulsion.

In general the higher the flocculation temperature the lower the density of the obtained material. Preferably the flocculation is carried out at a temperature of between 40° and 80° C., most preferably between 50° and 70° C. Electrolytes (such as phosphates) used for flocculation can be preheated to about 50°–100° C.

The flocculated material is then dried, for example by freeze-drying, and if necessary ground.

Fast freeze-drying techniques are advantageously used to speed-up the drying process.

After the flocculation step an extra process step can be added in order to reduce the residual isocyanate groups present in the obtained material. This can be achieved by additional cookdown or by additives (such as curing agents).

Further, sticking additives (such as low melting point waxes and tacky polymers, for example, polydienes and polyvinylacetates and copolymers thereof e.g. poly (ethylenevinylacetate)) can be added so as to obtain a low dust form of the material.

Co-flocculation with inorganic powders (such as Laponite RDS available from Laporte) or metal flakes (such as aluminum flakes) is another embodiment of the present flocculation method.

Still another method of making the microvoid polyurethane materials according to the present invention is a blowing method involving emulsifying a urethane-modified isocyanate-ended prepolymer and a blowing agent in water at a temperature above the boiling point of the blowing agent, stirring the emulsion for a certain period of time and drying the obtained material.

Therefore the present invention also provides a method for making microvoid polyurethane materials comprising the steps of a) emulsifying a mixture of a hydrophilic isocyanate-ended prepolymer composition and an inert organic blowing agent in an agitated aqueous solution at a temperature above the boiling point of the blowing agent, b) stirring the emulsion until completion of the reaction of the prepolymer with water, and d) drying the obtained material.

By this blowing method microballoons are obtained having a urethane-modified polyurea skin encapsulating the blowing agent, the size of these microballoons ranging from 0.1 to 10 micron, generally from 0.1 to 5 micron.

The hydrophilic isocyanate/ended prepolymer for use in the present blowing method is of the same type as described above for the flocculation method.

The inert organic blowing agent used in the present blowing method can be any inert organic blowing agent conventionally used in the preparation of polyurethane foams. Such blowing agents include inert low boiling compounds having a boiling point of above −70° C. at atmospheric pressure. Suitable inert blowing agents include those well known and described in the art, for example hydrocarbons, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers.

Suitable hydrocarbon blowing agents include lower aliphatic or cyclic hydrocarbons such as n-pentane, isopentane, cyclopentane, neopentane, hexane and cyclohexane.

Suitable dialkyl ethers to be used as blowing agents include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable alkyl alkanoates which may be used as blowing agents include methyl formate, methyl acetate, ethyl formate and ethyl acetate.

Suitable hydrofluorocarbons which may be used as blowing agents include lower hydrofluoroalkanes, for example difluoromethane, 1,2-difluoroethane, 1,1,1,4,4,4-hexafluorobutane, pentafluoroethane, 1,1,1,2-tetrafluoroethane and 1,1,2,2-tetrafluoroethane.

Suitable hydrochlorofluorocarbons which may be used as blowing agents include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as blowing agents include trichlorofluoromethane, dichlorodifluoromethane, trichlorotrifluoroethane and tetrafluorodichloroethane.

Suitable hydrochlorocarbons which may be used as blowing agents include 1- and 2-chloropropane.

Suitable fluorine-containing ethers which may be used as blowing agents include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Preferred blowing agents for use in the blowing method according to the present invention are pentane, cyclopentane and trichlorofluoromethane.

The blowing agent can be soluble in isocyanates or, if insoluble in isocyanates, the blowing agent can be emulsified into the isocyanate.

The blowing agent is used in amounts of from 5 to 30% and preferably from 15 to 20% by weight based on the hydrophilic isocyanate-ended prepolymer.

The emulsification of the hydrophilic isocyanate-ended prepolymer and the blowing agent in water has to be carried out at a temperature above the boiling point of the blowing agent, preferably about 10° C. above this boiling point. Alternatively the emulsification can be performed at one temperature, increasing the temperature thereafter.

Further, infrared absorbers such as carbon black, metal flakes or iron oxides may be added in order to further reduce the thermal conductivity of the obtained polyurethane material.

After emulsification, mixing is continued to complete the curing reaction of the hydrophilic isocyanate-ended prepolymer with water forming the polyurea skin.

Drying the obtained material can be done by freeze-drying.

Still another method of making the microvoid polyurethane materials according to the present invention is a reversed emulsification method involving mixing two different urethane-modified isocyanate-ended prepolymers of differing hydrophobicities, adding water to this mixture, stirring the emulsion for a certain period of time and drying the obtained material.

Therefore the present invention also provides a method for making microvoid polyurethane materials comprising the steps of a) mixing a hydrophilic isocyanate-ended prepolymer composition and a hydrophobic isocyanate-ended prepolymer composition, b) adding water to this mixture under constant stirring, the water being added slowly initially until the phase inversion point of the emulsion system is reached, c) stirring the emulsion until complete reaction, and d) drying the obtained material.

By this reversed emulsification method microporous urethane-modified polyurea particles are obtained having a particle size of between 0.5 and 20 micron, generally between 0.5 and 5 micron and having a high internal porosity.

The hydrophilic isocyanate-ended prepolymer for use in the present reversed emulsification method is of the same type as described above for the flocculation method.

The hydrophobic isocyanate-ended prepolymer used in the present reversed emulsification method is not emulsifiable in water at the working temperature.

The hydrophobic isocyanate-ended prepolymer for use in the reversed emulsification method of the present invention is the reaction product of a stoichiometric excess of a polyisocyanate and a hydrophobic polyoxyalkylated monol.

The hydrophobic polyoxyalkylated monol generally corresponds to the formula R-A-OH, wherein R is $C_{1-25}$ alkyl, preferably $C_{8-22}$ alkyl and A is a polyoxypropylene chain containing up to 25% polyoxyethylene units. The term "alkyl" as used herein is to be understood to include within its meaning both straight and branched chain variants. Preferably A is a polyoxypropylene chain containing 5 to 15 propyleneoxy units. Particular mention may be made of the polyoxyalkylated monols obtained by propoxylation of stearyl alcohol, for example that containing an average of 10 propyleneoxy units, available from Imperial Chemical Industries PLC under the registered trade mark Arlamol E.

The hydrophobic polyoxyalkylated monol preferably has a molecular weight in the range of 325 to 1240, more preferably in the range of 410 to 1190 and even more preferably in the range of 550 to 1140.

The polyisocyanate for use in the preparation of the present hydrophobic isocyanate-ended prepolymer may be any organic polyisocyanate. Suitable materials are the same as listed above for the hydrophilic isocyanate-ended prepolymer.

The hydrophobic isocyanate-ended prepolymer for use in the present reversed emulsification method suitably has an isocyanate value within the range 11 to 29. This generally corresponds to a ratio of polyisocyanate to polyoxyalkylated monol of between 40:60 to 95:5.

The hydrophobic isocyanate-ended prepolymers for use in the present reversed emulsification method are prepared according to generally known methods such as described above for the hydrophilic isocyanate-ended prepolymer.

The hydrophilic and hydrophobic isocyanate-ended prepolymers for use in the present reversed emulsification method may be derived from the same polyisocyanate or from a different polyisocyanate.

They can be prepared separately and then mixed together or they can be prepared in situ if they are derived from the same polyisocyanate.

The two prepolymers are mixed at such ratios that the final prepolymer mixture has an ethyleneoxide/propyleneoxide ratio of from 10:90 to 80:20. The NCO value of the prepolymer mixture is preferably between 10 and 25. The preferred prepolymer mixture has an NCO value of 18 and the ratio ethyleneoxide/propyleneoxide is about 40:60.

Suitable adhesives such as catalysts, surfactants or solvents can be added to this prepolymer mixture.

Suitable catalysts include tertiary amines such as imidazoles, dimethylcyclohexylamine or triethylene diamine and metal carboxylates such as potassium acetate and potassium ethylhexoate.

Suitable surfactants include silicone surfactants.

Suitable solvents added to decrease the viscosity of the mixture are preferably water soluble and volatile and include acetone, tetrahydrofuran, 1,4-dioxan and dimethylformamide.

Further, infrared absorbers such as carbon black, metal flakes or iron oxides may be added in order to further reduce the thermal conductivity of the obtained polyurethane material.

Under high speed mixing water is added to this prepolymer mixture. This can be done at room temperatures, but also lower temperatures (to about 0° C.) or higher temperatures (to about 50° C.) can be used.

Initially the water is dripfed into the prepolymer mixture. The rate of addition of the water is very important: if the water is added too slowly a solid mass is formed before all of the water is added, if the water is added too quickly rapid phase inversion takes place. Generally the rate of water addition is between 20 and 170% by weight of water based on the isocyanate weight per minute and preferably about 40% by weight per minute.

First a water-in-oil emulsion is formed where the isocyanate is the oil phase. Then a phase inversion of the emulsion takes place and an water-in-oil-in-water emulsion is formed. After the phase inversion water is added quickly.

The solids content of the final emulsion is generally between 10 and 30% by weight.

The emulsion is being stirred to ensure full reaction of the isocyanate ends of the prepolymers with water thereby evolving carbon dioxide. The multiple water-in-oil-in-water emulsions together with the carbon dioxide evolving gives rise to the formation of microporosity in the obtained polyurea particles.

Thereafter the reaction mixture is allowed to settle, the additional liquid is removed and the obtained polyurea particles are dried (for example by freeze-drying) and ground if necessary.

Still another method of making the microvoid polyurethane materials of the present invention is a flash off method involving dissolving a polyisocyanate in a volatile solvent in the presence of an isocyanate trimerisation catalyst, maintaining said mixture in a quiescent state while the solution gels, increasing the temperature of a closed vessel containing the gelled mass and then suddenly releasing the pressure from this vessel.

Therefore the present invention also provides a method for making microvoid polyurethane materials comprising the steps of a) dissolving a polyisocyanate in a volatile solvent in the presence of an isocyanate trimerisation catalyst, b) maintaining said mixture in a quiescent state while the solution gels, c) increasing the temperature above the boiling point of the solvent while the gelled mass is kept in a closed vessel, d) suddenly releasing the pressure from said vessel.

By this flash off method polyisocyanurate fractals are obtained of rod like or spherical structure with each larger structure being composed out of smaller spheres which in turn are build up from even smaller spheres, some of them revealing hollow surface structures. The feature size (i.e. the size of the loose larger particles) is generally in the range 0.5 to 20 micron and most generally in the range 3 to 5 micron while the size of the smaller particles which build up such a larger particle can be lower than 0.5 micron.

Polyisocyanates for use in the present flash off method include aliphatic, cycloaliphatic, araliphatic and aromatic polyisocyanates known in the literature for use generally in the production of polyisocyanurate materials. Of particular importance are aromatic polyisocyanates such as tolylene and diphenylmethane diisocyanate in the well known pure, modified and crude forms, in particular diphenylmethane diisocyanate (MDI) in the form of its 2,4'-, 2,2'- and 4,4'-isomers (pure MDI) and mixtures thereof known in the art as "crude" or polymeric MDI (polymethylene polyphenylene polyisocyanates) having an isocyanate functionality of greater than 2 and the so-called MDI variants (MDI modified by the introduction of urethane, allophanate, urea, biuret, carbodiimide, uretonimine or isocyanurate residues).

The polyisocyanate is used in amounts ranging from 2 to 50% by weight based on the total reaction mixture and preferably from 5 to 40% by weight and more preferably from 5 to 30% by weight and most preferably from 10 to 20% by weight.

Volatile solvents for use in the present flash off method include any solvent having a boiling point below 80° C. at atmospheric pressure, preferably below 60° C., more preferably below 40° C. and most preferably below 30° C. Generally the boiling point of the volatile solvent at atmospheric pressure is above −70° C.

Suitable volatile solvents for use in the flash off method according to the present invention include hydrocarbons, dialkyl ethers, alkyl alkanoates, ketones, aliphatic and cycloaliphatic hydrofluorocarbons, hydrochlorofluorocarbons, chlorofluorocarbons, hydrochlorocarbons and fluorine-containing ethers. Mixtures of such compounds can also be used.

Suitable hydrocarbon volatile solvents include lower aliphatic or cyclic hydrocarbons such as n-pentane, isopentane, cyclopentane, neopentane, hexane and cyclohexane.

Suitable dialkyl ethers to be used as volatile solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable alkyl alkanoates which may be used as volatile solvent include methyl formate, methyl acetate, ethyl formate and ethyl acetate.

Suitable ketones which may be used as volatile solvent include acetone and methyl ethyl ketone.

Suitable hydrofluorocarbons which may be used as volatile solvent include lower hydrofluoroalkanes, for example difluoromethane, 1,2-difluoroethane, 1,1,1,4,4,4-hexafluorobutane, pentafluoroethane, 1,1,1,2-tetrafluoroethane and 1,1,2,2-tetrafluoroethane.

Suitable hydrochlorofluorocarbons which may be used as volatile solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane, and 1,1,1,2-tetrafluoro-2-chloroethane.

Suitable chlorofluorocarbons which may be used as volatile solvent include trichlorofluoromethane, dichlorodifluoromethane, trichlorotrifluoroethane and tetrafluorodichloroethane.

Suitable hydrochlorocarbons which may be used as volatile solvent include 1- and 2-chloropropane and dichloromethane.

Suitable fluorine-containing ethers which may be used as volatile solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl, fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Preferred volatile solvents for use in the flash off method according to the present invention are trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and dichloromethane.

Trimerisation catalysts for use in the flash off method according to the present invention include any isocyanate trimerisation catalyst known in the art such as quaternary ammonium hydroxides, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Especially the triazine derivatives are preferred. Specific preferred trimerisation catalysts for use in the present flash off method are Polycat 41 available from Abbott Laboratories, and DABCO TMR, TMR-2 and TMR-4 available from Air Products.

The polyisocyanate/trimerisation catalyst weight ratio varies between 50 and 500, preferably between 50 and 200.

The volatile solvent chosen is preferably one in which the polyisocyanate is soluble. The polyisocyanate can also be emulsified into the volatile solvent.

Surfactants can be added in order to improve the solubilisation and/or emulsification. Suitable surfactants include fluorosurfactants such as FC 430 available from 3M and silicone surfactants such as F 200 available from Dow Corning and B 8423 available from Goldschmidt. These surfactants are then added in amounts of from 0.01 to 5% by weight based on the polyisocyanate weight.

Other additives can also be used. Examples include rheological modifiers such as organoclays, fillers and viscosity reducers. These additives are especially useful in the production of low density (densities under vacuum of below 300 $kg/m^3$) fractal materials according to the present invention.

Further, infrared absorbers such as carbon black, metal flakes or iron oxides may be added in order to further reduce the thermal conductivity of the obtained polyurethane material.

The mixing of the polyisocyanate, the trimerisation catalyst and the volatile solvent is done at a temperature below the boiling point of the volatile solvent, preferably about 10° C. below said boiling point. Usually this mixing is done at room temperature or at somewhat higher temperatures (about 30° C.).

Thereafter the mixture is left standing for a certain period of time to allow the trimerisation reaction to take place producing a gelled mass.

The gelled mass is then put into a closed vessel and the temperature increased above the boiling point of the volatile solvent, generally 10° C. to 20° C. above said boiling point. This causes an increase of the pressure inside the vessel. The pressure inside the vessel generally reaches at least 3 bar.

The pressure is then suddenly released from the vessel to obtain the fractal materials of the present invention.

If necessary the obtained material can be dried, for example, in a vacuum oven.

The microvoid polyurethane materials of the present invention can be used as fillers for plastics, coatings, concrete, etc., for example as filler in polyurethane foam. The fillers can either be employed in powder form or predispersed in a liquid component. The microvoid polyurethane materials of the present invention can also be used as opacifiers in paint compositions or in the delivery of drugs or pesticides. Further uses include absorbing or filtering of liquids, use as fire retardants (especially the fractal type materials) or as foam window thinning reducing agents, for example, in polyurethane foam.

One important application of the microvoid polyurethane materials according to the present invention is in evacuated insulation panels where these materials act as insulating filler.

The present invention therefore also provides an evacuated insulation panel filled with the microvoid polyurethane material of the present invention and a method for making these evacuated insulation panels.

The evacuated insulation panel of the present invention may comprise as filler solely a microvoid polyurethane material of the present invention or may comprise as filler a blend of a microvoid polyurethane material of the present invention and a conventional finely divided inorganic powder such as precipitated silica or fumed silica.

In manufacturing the evacuated insulation panel of the present invention the insulating filler material of the present invention is enveloped in a vessel of low thermal conductivity material which has a low permeability to atmospheric gases and the interior thereof is evacuated to a desired pressure level, in general to about 1–2 mbar, and then the vessel is sealed.

The vessel is preferably made of a film material which has a gas permeability as low as possible and which is easily sealed by heat sealing. The gas permeation rate of the vessel directly affects both the occurence of heat leakage and thus the thermal insulation efficiency of the resulting evacuated insulation panel as well as the operating lifetime of the panel. Materials suitable for the vessel include plastics such as polyester, polyvinylidene chloride, polypropylene and polyvinyl alcohol. Preferably the plastics film is vapor deposited with a metallic film or laminated with a metallic foil providing for higher protection against vacuum leak. The plastic film bag may also include a heat sealed layer made of a polyolefin, such as a polyethylene and a polypropylene, a polyamide, such as nylon 11 and nylon 12, a polyacrylonitrile or a similar synthetic resin.

An air permeable pouch may be used to provide a container for the insulating filler material of the present invention in order to facilitate further processing.

The air permeable pouch material is chosen based on its ability to contain the filler material which is a function of both the porosity of the pouch material and the powder particle size. The pouch material is further chosen due to its air permeability characteristics. The air permeability of the pouch is an important factor since during processing the pouch is placed in the vessel which is subsequently evacuated and thus the permeability of the pouch impacts the time required to evacuate the vessel to the desired pressure level. Other less critical factors in the determination of a suitable pouch material are the ease with which the pouch may be sealed, for example by heat sealing or adhesive bonding and the durability of the pouch, so that handling during fabrication will not damage the pouch.

It is preferred to precondition the insulating filler material of the present invention prior to placement in the air permeable pouch or in the gastight envelope.

This preconditioning involves heating and agitating the filler material in order to remove contaminants from the surface of the filler particles. The removal of filler contaminants improves inter alia the expected panel life. Further the removal of contaminants reduces the time required to evacuate the vessel thereby reducing the time and cost associated with the manufacture of an evacuated insulation panel.

One type of apparatus for preconditioning the filler material with heat and agitation is a fluidized bed drier in which heated air is directed through the filler material. An alternative method for preconditioning the filler by heating consists of placing the filler in a heated chamber in which an agitating mechanism or a stirrer may be disposed to provide agitation. Reduced pressures may also be used together with heating and/or agitation.

It is generally necessary to provide within the sealed panels materials to absorb or otherwise interact with gases and vapors that remain due to imperfect evacuation, that permeate the enclosure from the outside atmosphere or evolve from the filler material itself. Such materials are known as getters and may include, for example, a granular form of calcium sulfate which is excellent in removing water vapor, activated carbon to remove organic gases and zeolites to absorb carbon dioxide and nitrogen. Other suitable getter materials are described in U.S. Pat. Nos. 4,000,246, 4,444,821, 4,663,551, 4,702,963 and 4,726,974 and in European Patent Publications Nos. 434266 and 181778.

A method of fabricating evacuated insulation panels is as follows.

Optionally, the filler material is first preconditioned with heat and agitation, preferably under reduced pressure. The filler is then placed into an air permeable pouch and the pouch is sealed by any conventional technique. The filled pouch is then compressed and placed in the gas barrier envelope. The vessel is placed in an evacuation chamber, evacuated to the desired pressure and sealed. The panels thus provided are relatively rigid and have a thickness of approximately 1 to 5 cm.

The insulation panels can also instead of being totally evacuated be partially or fully filled with a gas of a high thermal insulation value such as Xenon or Krypton. Loadings of 20 to 50 mbar of these gases would mask the dilution effect of air ingress into the panel over the lifetime of the panel (15 to 20 years).

The evacuated insulation panels of the present invention may comprise only one compartment or may comprise several interior compartments, each one filled with a suitable insulation material, at least one of which is a microvoid polyurethane material according to the present invention.

Refrigeration appliance is only a single example of a product that can utilise evacuated insulation panels. They can also form part of an insulating building panel. Other environments having a hot side and a cold side could also benefit from the use of the present invention.

The rigid evacuated insulation panels can be easily arranged in the door and walls of a refrigerator. They are generally attached by adhesive to the walls of the thermal device to be insulated and then foamed-in-place with a liquid organic material such as polyurethane. The polyurethane foam then assists in holding the panels in place between the walls and also provides additional insulation.

Further descriptions relating to the construction of evacuated insulation panels and their use in thermal devices can be found in U.S. Pat. Nos. 5,066,437, 5,032,439 and 5,076,984 and European Patent Publications Nos. 434266, 434225 and 181778, all incorporated herein by reference as well as the references mentioned therein.

The various aspects of this invention are illustrated but not limited by the following examples.

EXAMPLE 1

Solvent Precipitation Method

The following products are hereinafter used:

Bentone 34 being an organoclay available from NL Chemicals Ltd.;

Voranol RA800 being an ethylene diamine based polyol with 3 moles propylene oxide and 1 mole ethyleneoxide available from Dow Chemical;

Suprasec DNR being a polymeric MDI available from Imperial Chemical Industries;

DC 193 being a silicone surfactant available from Air Products;

Arcton 11 being trichlorofluoromethane available from Imperial Chemical Industries.

Toluene (1152 g) and Bentone 34 (18.2 g) were mixed with the Silverson model L2R mixer for 10 minutes. Polyol Voranol RA800 (76.7 g) was added and stirred in.

Toluene (260 g) and Suprasec DNR (149 g) were mixed by shaking in a bottle.

The isocyanate solution was added to the polyol solution and mixed for 1 to 2 minutes by shaking the bottle.

The resulting mixture was poured into an aluminum tray of 18 cm by 18 cm. The sample was left to cure for 24 hours in the fumecupboard. The aluminium tray was removed and the sample was left to dry at room temperature.

After drying, a piece measuring 15 cm by 15 cm by 3.5 cm was cut to evaluate lambda versus pressure characteristics.

Vacuum density of the obtained material was 190 kg/m$^3$, bead size was 2 to 3 micron.

A SEM (Scanning Electron Microscope) photograph of the obtained material is presented as FIG. 1.

The sample is referred to hereinafter as sample I.1.

The same experiment was repeated with different amounts of ingredients.

Sample I.2 was prepared using 1361 g toluene, 27.3 g Bentone 34, 115.1 g Voranol RA800 and 223.5 g Suprasec DNR. A material having a vacuum density of 240 kg/m$^3$ and a bead size of 2 to 2.5 micron was obtained.

Sample I.3 was prepared using 1238 g toluene, 32.8 g Bentone 34, 138.1 g Voranol RA800 and 268 g Suprasec DNR. A material having a vacuum density of 300 kg/m$^3$ and a bead size of 2 to 2.5 micron was obtained.

Polyol Voranol RA800 (106.2 g), surfactant DC193 (3.6 g), toluene (327.2 g) and Arcton 11 (1955 g) were mixed together by shaking.

Suprasec DNR (207 g) was added hereto and mixed herewith for 1 to 2 minutes by shaking.

The resulting mixture was poured into an aluminium tray of 18 cm by 18 cm. The tray was left standing in a 20° C. water bath. The sample was left to cure for 24 hours.

The water bath was then removed. The sample was taken from the tray and allowed to dry at room temperature.

After drying, a piece measuring 15 cm by 15 cm by 3.5 cm was cut to evaluate lambda versus pressure characteristics.

Vacuum density of the obtained material was 220 kg/m$^3$, bead size was 1 to 1.5 micron.

Figure 2:
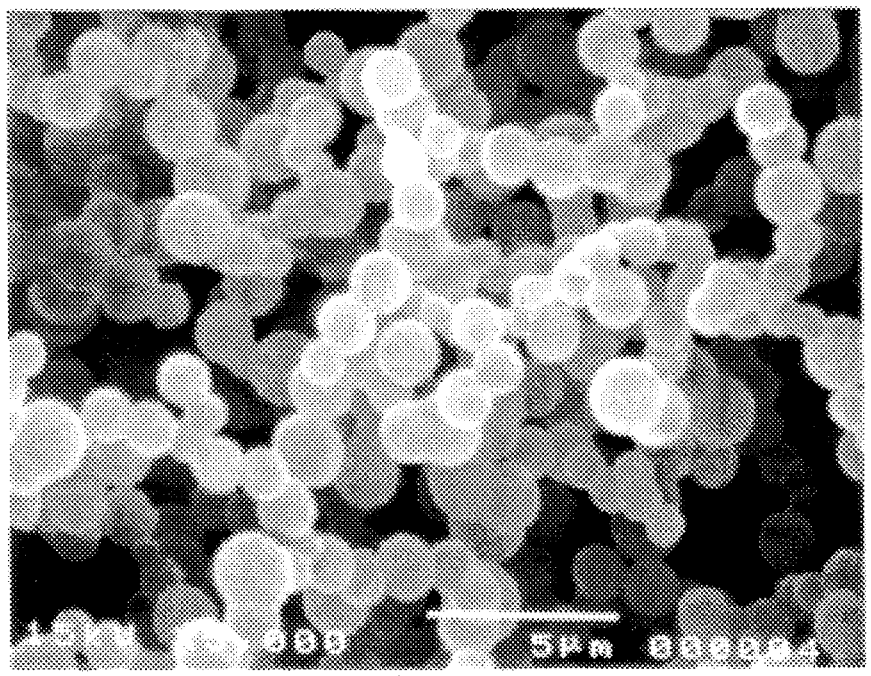

A SEM photograph of this sample (referred to hereinafter as sample I.4) is presented as FIG. 2.

EXAMPLE 2

Flocculation Method

A prepolymer was made by a standard procedure from a hydrophilic monol and polymeric MDI by drip feeding the monol into the isocyanate at 80° C. over one hour with constant stirring. The stirring was continued for a further 2 hours to ensure complete reaction. If necessary the monol was dried to below 0.5% water content before prepolymerisation and should preferably contain less than 5 ppm of catalyst impurities such as sodium or potassium. The monol used was a sodium methoxide initiated random ethyleneoxide/propyleneoxide copolymer of approximate molecular weight 600 containing 85% ethyleneoxide units and possessing an OH value of 94. The prepolymer was prepared by reacting 65.5 parts of polymeric MDI of NCO value 30.6 with 34.5 parts of said monol; a prepolymer of NCO value 17.5 was obtained.

15 parts of said prepolymer was emulsified into 85 parts of distilled water at room temperature with a high shear rotor/stator mixer (Silverson L2R), the high shear mixing being continued for 10 minutes after addition of all of the prepolymer. The emulsion mixture was then transferred to a propeller mixer and mixing continued for a further 110 minutes. A solution of tribasic potassium phosphate (100 g in 2000 g water) was then added at a ratio of 25 g phosphate solution to 100 g emulsion and the mixture poured into a covered tray and placed in an oven at 60° C. The emulsion gelled within a few minutes and was allowed to fully cure overnight. The gelled product was granulated, frozen in liquid nitrogen, freeze dried (Christ Alpha 1-4) and pulverised in a mortar and pestle.

The final free-flowing white powder gave a vacuum density of 290 kg/m$^3$, a particle size of 0.14 micron and a surface area of 15 m$^2$/g (measured via BET).

This material is referred to hereinafter as sample II.1.

Sample II.2 was prepared by pouring 150 g of the above described prepolymer in 1350 g distilled water at 40° C. over a period of 1 minute while mixing with a Silverson L2R high speed mixer. After 5 minutes high shear mixing the mixing was continued on a propeller mixer (IKA RW20) for 20 minutes while the temperature was kept at 40° C.

When the foaming reaction started (after 5 to 10 minutes) a tiny amount (0.5 to 1 g) decanol was added to stop the foaming.

After 25 minutes the dispersion was poured in a 0.5% $K_3PO_4$ solution (1500 g) at 83° C. to cause the dispersion to flocculate.

The flocculated particles were filtered off after 1 night standing and freeze-dried in trays on the CHRIST ALPHA 1-4 freeze drier.

Figure 3:
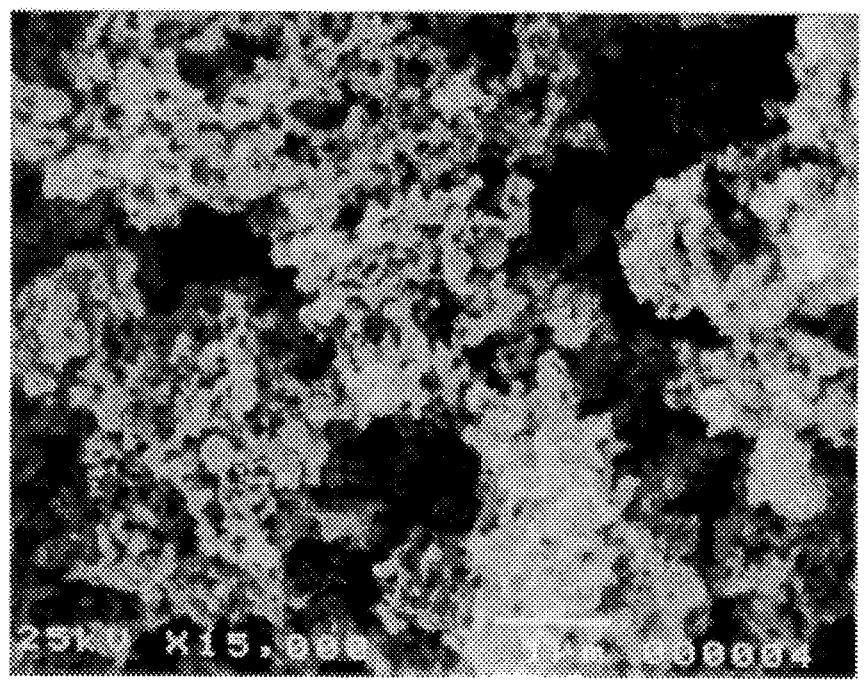

Vacuum density of the obtained material was 230 kg/m$^3$, particle size was 0.12 micron and surface area was 26.5 m$^2$/g. A SEM photograph of the obtained material is presented as FIG. 3.

A prepolymer was made by the standard procedure as described above from 25% of a monol derived from sodium methoxide and containing 85% ethyleneoxide units and a high polymeric MDI polyisocyanate containing 12% diisocyanate and 25% triisocyanate.

200 g of this prepolymer was added to 1800 g of water at 40° C. in 1 minute using high shear mixing. After 5 minutes high shear mixing and 13 minutes propellor mixing at 40° C. the mixture was poured in 2000 g of 0.5% $K_3PO_4$ solution at 84° C. The flocculated material was left standing for 24 hours and freeze dried.

Density of the obtained material (referred to hereinafter as sample II.3) was 176 kg/m$^3$, primary particle size (measured with a Malvern Zetasizer) was 85 nm and surface area (measured using BET) was 58 m$^2$/g.

A prepolymer was made by the standard procedure as described above from 25% of poly (ethyleneglycolmethylether) of molecular weight 550 as monol and a high polymeric MDI polyisocyanate.

250 g of this prepolymer was added to 2250 g of water at 40° C. in 1 minute using high shear mixing. After 5 minutes high shear mixing and 10 minutes propellor mixing the mixture was poured in 2500 g of 0.5% $K_3PO_4$ solution at 82° C. The flocculated material was left standing for 24 hours and freeze dried.

Density of the obtained material (referred to hereinafter as sample II.4) was 248 kg/m$^3$, primary particle size (measured with a Malvern Zetasizer) was 66 nm and surface area (measured using BET) was 72 m$^2$/g.

A prepolymer was made by the standard procedure as described above from 25% of poly (ethyleneglycolmethylether) of molecular weight 550 as monol and a high polymeric MDI polyisocyanate.

200 g of this prepolymer was added to 1800 g of water at 40° C. in 1 minute using high shear mixing. After 5 minutes high shear mixing and 10 minutes propellor mixing the mixture was poured in 2000 g of 0.5% $K_3PO_4$ solution at 94° C. The material was stirred for 5 minutes after flocculation and freeze dried after another 24 hours standing.

Density of the obtained material (referred to hereinafter as sample II.5) was 172 kg/m$^3$, primary particle size (measured

EXAMPLE 3

Blowing Method

A prepolymer was made by the standard procedure as described for sample II.1 from the same monol (30%) and a raffinate of polymeric MDI containing 12% difunctional and 25% trifunctional isocyanate (70%).

To 400 g of this prepolymer was added 60 g of HCFC 141b blowing agent (1,1-dichloro-1-fluoroethane) and this mixture was poured into 700 g water at 0° C. while stirring with a Silverson L2R mixer for 1 minute. This mixture was then poured into 1500 g water at 85° C., mixed on the IKA RW 20 mixer at about 500 rpm for 1.5 to 2 hours and then left standing at room temperature for at least 20 hours. Thereafter the mixture was prefreezed in a flask in liquid nitrogen and then dried on the CHRIST Alpha 1–4 freeze drier.

Figure 4:
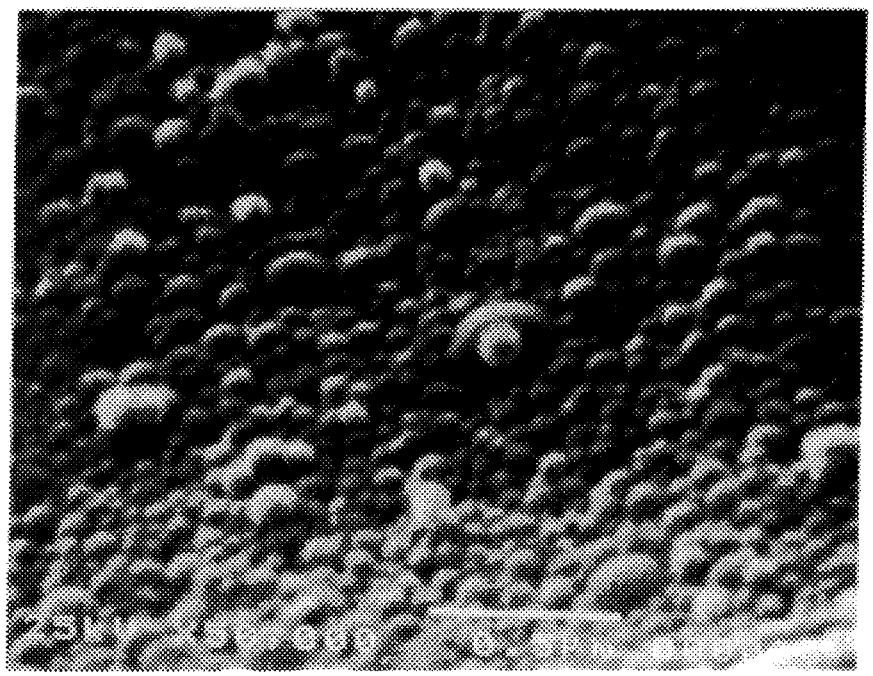

The vacuum density of this sample (referred to hereinafter as sample III.1) was 580 kg/m$^3$. Particle size measured with a Malvern Zetasizer 4 was about 0.25 micron. Surface area measured via BET was 6.5 m$^2$/g. A SEM photograph is presented as FIG. 4.

15% HCFC 141b was added to a mixture of 35% of a hydrophilic prepolymer as described above for sample II.1 and a raffinate of polymeric MDI containing 12% difunctional and 25% trifunctional isocyanate. 400 g of the resulting mixture was poured into water at 40° C. under high shear mixing (1.5 minute mixing with the Silverson L2R mixer). The reaction was completed after 1.5 hours mixing on the IKA RW20 mixer. The mixture was thereafter freeze-dried.

The obtained microvoid polyurethane material (referred to hereinafter as sample III.2) had a vacuum density of 430 kg/m$^3$, a particle size of 0.5 micron and a surface area (measured via BET) of 2.7 m$^2$/g.

EXAMPLE 4

Reversed Emulsification Method

A hydrophilic prepolymer was prepared as described above in example 3.

A hydrophobic prepolymer was prepared using the same method from 70% of a raffinate of polymeric MDI containing 12% difunctional and 25% trifunctional isocyanate and 30% Arlamol-E.

30 g acetone was added to 400 g of a mixture of 60% hydrophobic prepolymer and 40% hydrophilic prepolymer to reduce the viscosity. 40 g of this mixture and 1 g of a catalyst of the type described in European patent publication no. 294161 was mixed on the Silverson L2R mixer. After 5 minutes water was dripfed with a peristaltic pump at an addition rate of 30.5 ml/min over a period of 1.5 minute. The sample was then poured into 100 g water at room temperature while mixed with the IKA RW20 mixer at approximately 500 rpm. This mixing was continued for 1.5 to 2 hours. Thereafter the mixture was freeze-dried.

Figure 5:
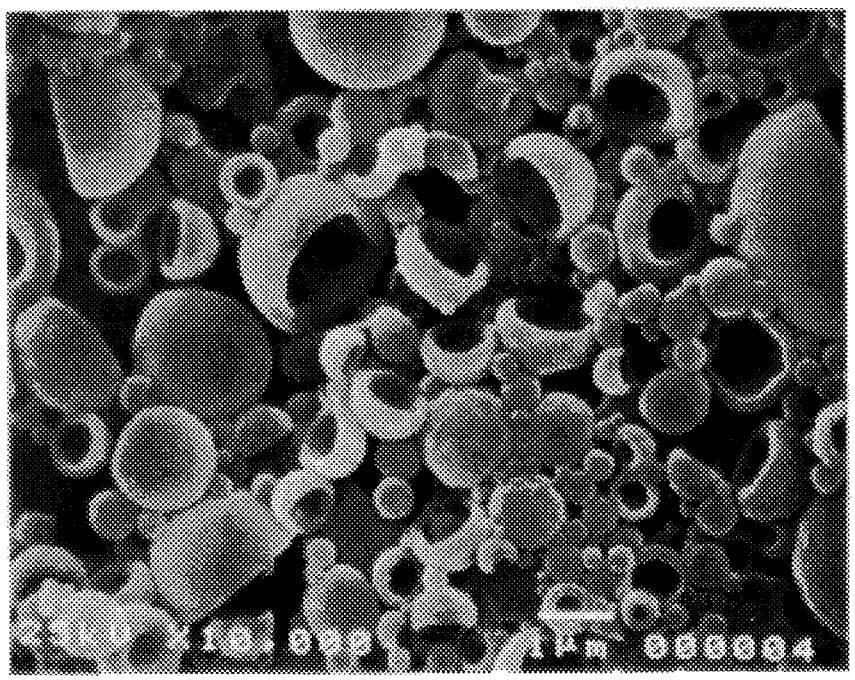

Several batches of 40 g were made in the same way and showed very reproducible vacuum densities (250 kg/m$^3$) and average particle sizes (1 micron). A SEM photograph of this sample (referred to hereinafter as sample IV.1) is presented as FIG. 5. The surface area measured via BET was 4.7 m$^2$/g.

The different batches were collected for lambda versus pressure measurement.

EXAMPLE 5

Flash Off Method 32 g of the viscosity reducer Arconate 1000 (available from Arco) and 32 g of the organoclay Bentone 27 (available from NL Chemicals Ltd) were mixed together. This mixture was emulsified in 1536 g of HCFC 141b by high shear mixing in a pressure vessel. 150 g of pure MDI Suprasec MPR (available from Imperial Chemical Industries) was dissolved in 1350 g of this HCFC 141b solution. To this mixture was added another 140 g of pure HCFC 141b and 3 g of FC 430 surfactant (available from 3M). The mixture was stirred and 0.75 g of Polycat 41 (available from Abbott Laboratories) was added. This mixture was left standing at 25° C. for one night after which an opaque white gel was obtained. The pressure vessel was closed and heated to 55° C. After two hours at this temperature the pressure inside was released via the relief valve. The obtained powder was ground and a post cure and drying period under vacuum at 50° to 60° C. for 4 hours followed.

The density of this sample (referred to hereinafter as sample V.1) under vacuum was 260 kg/m$^3$.

Figure 6:
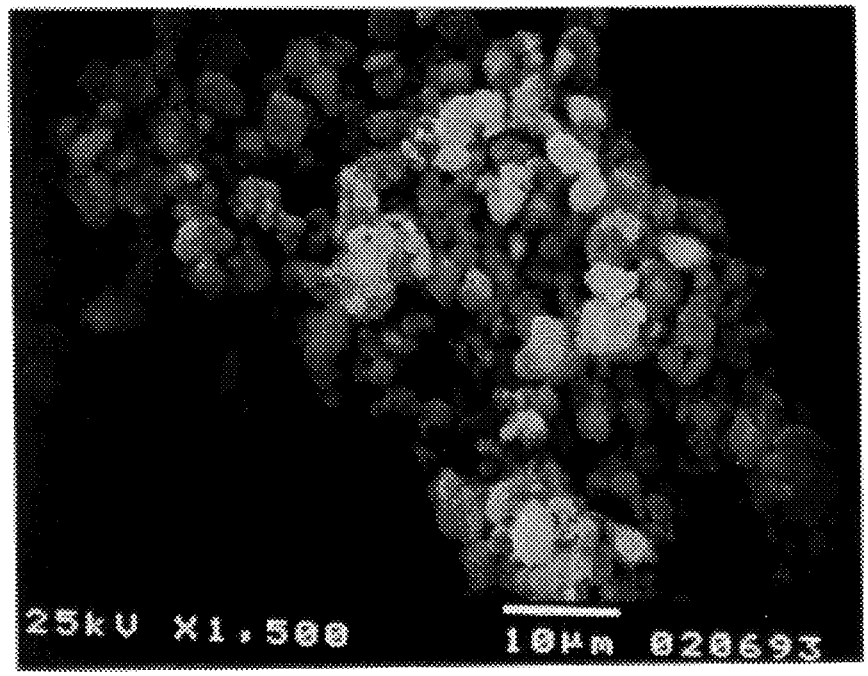

A SEM photograph of this sample is presented as FIG. 6.

30 g of Arconate 1000 and 30 g of Bentone 27 were mixed together. This mixture was emulsified in 1440 g of CFC 11 by high shear mixing in a pressure vessel. 130 g of Suprasec MPR was dissolved in 1200 g of this CFC 11 solution. To this mixture was added another 100 g of pure CFC 11 and 2.6 g of FC 430 surfactant. The mixture was stirred and 2.6 g of Polycat 41 was added. This mixture was left standing at 25° C. for one day after which an opaque white gel was obtained. The pressure vessel was closed and heated to 50° C. After two hours at this temperature the pressure inside was released via the relief valve. The obtained powder was ground and a post cure and drying period under vacuum at 50° to 60° C. for 4 hours followed.

The density of this sample (referred to hereinafter as sample V.2) under vacuum was 220 kg/m$^3$.

Figure 7A:
Figure 7B:
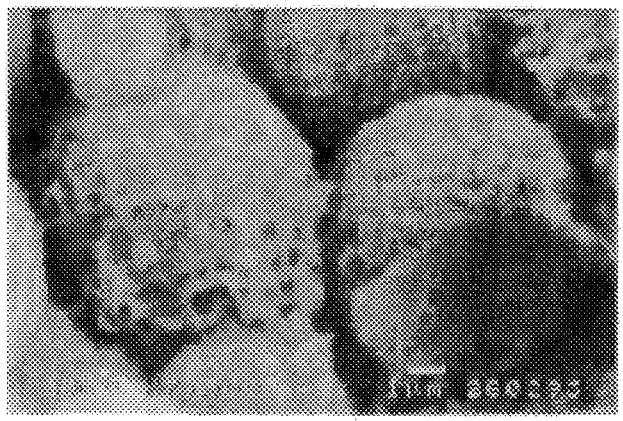
Figure 7C:
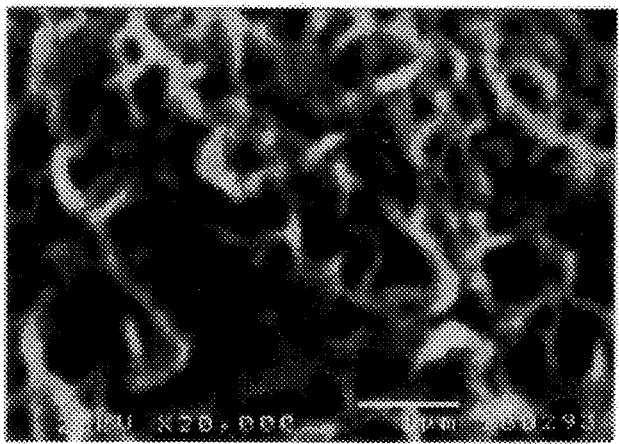

SEM photographs of this sample are presented as FIG. 7.

5 g of Suprasec MPR was weighed into a glass pressure vessel. 5 g of $CH_2Cl_2$ was added and the Suprasec MPR dissolved. 0.05 g of Polycat 41 was added hereto via a micro syringe. The pressure vessel was fitted with an aerosol crimp valve. Immediately after the vessel was closed 40 g of liquid HCFC 22 under its own vapour pressure was added to the mixture. The mixture was shaken vigorously and left to gel at 30° C. for 2 hours after which an opaque white gel was obtained. The pressure inside the vessel was released via the aerosol valve. The thus obtained powder was ground.

The density of this sample (referred to hereinafter as sample V.3) under vacuum was 235 kg/m$^3$.

Figure 8A:
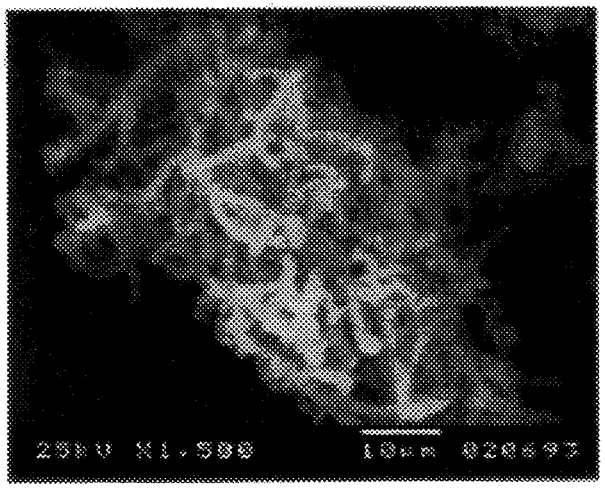
Figure 8B:
Figure 8C:
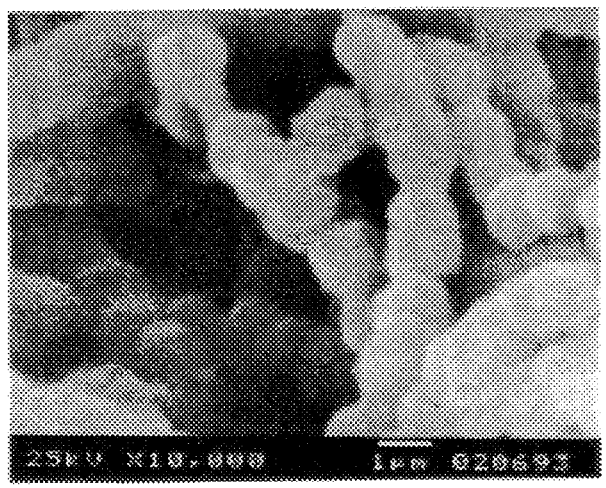

SEM photographs of this sample are presented as FIG. 8.

10 g of polymeric MDI Suprasec DNR (available from Imperial Chemical Industries) was weighed into a glass pressure vessel. 8 g of $CH_2Cl_2$ was added and the Suprasec DNR dissolved. 0.05 g of Polycat 41 was added hereto via a micro syringe. The pressure vessel was fitted with an aerosol crimp valve. Immediately after the vessel was closed 32 g of liquid HCFC 22 under its own vapour pressure was added to the mixture. The mixture was shaken vigorously and left to gel at 30° C. for 2 hours after which an opaque white gel was obtained. The pressure inside the vessel was released via the aerosol valve. The thus obtained powder was ground.

The density of this sample (referred to hereinafter as sample V.4) under vacuum was 440 kg/m$^3$.

Figure 9A:
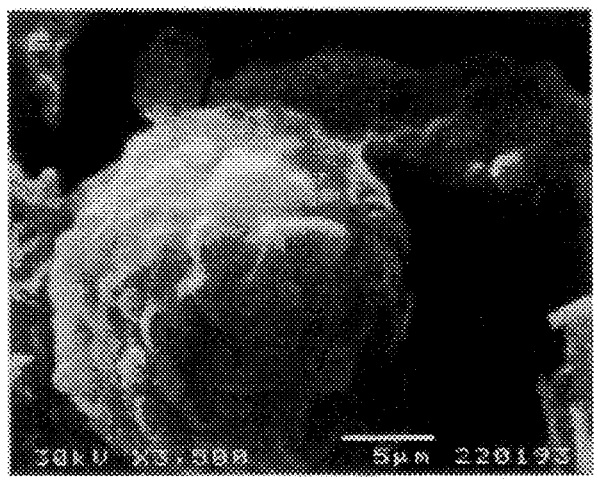
Figure 9B:
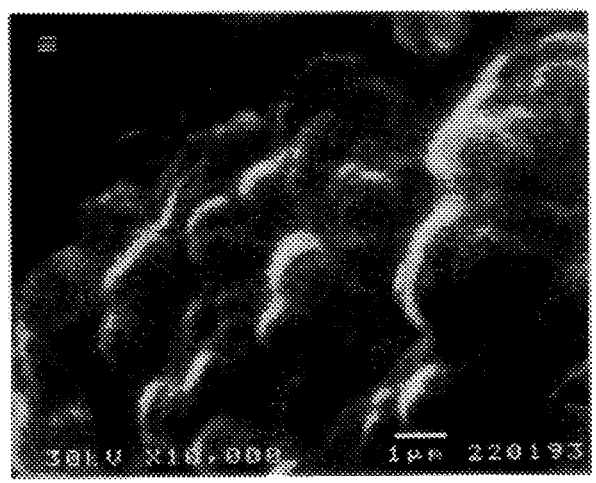
Figure 9C:

SEM photographs of this sample are presented as FIG. 9.

10 g of Suprasec MPR was weighed into a glass pressure vessel. 29 g of CFC 11 was added and the Suprasec MPR dissolved. 0.05 g of Polycat 41 was added hereto via a micro syringe. The pressure vessel was fitted with an aerosol crimp valve. Immediately after the vessel was closed 11 g of liquid HCFC 22 under its own vapour pressure was added to the mixture. The mixture was shaken vigorously and left to gel at 30° C. for 2 hours after which an opaque white gel was obtained. The pressure inside the vessel was released via the aerosol valve. The thus obtained powder was ground.

The density of this sample (referred to hereinafter as sample V.5) under vacuum was 330 kg/m$^3$.

EXAMPLE 6

Evacuated Insulation Panels

Evacuated insulation panels filled with microvoid polyurethane materials according to the present invention were prepared as follows.

The microvoid polyurethane material was preconditioned by drying in a vacuum oven for 4 hours at 80° C., if necessary.

A square frame of outer dimension 150 mm, inner dimension 140 mm and height 50 mm was cut out of flexible foam. Some filter paper was glued on the bottom of this frame. This frame was then put into another frame of outer dimension 180 mm, inner dimension 150 mm and height 20 mm out of metal with holes on the inner side.

The flexible frame was then filled with the preconditioned microvoid polyurethane material which was gently compressed by pushing with a piece of rigid foam. The top of the flexible frame was covered with a piece of filter paper to avoid the polyurethane material being sucked out by the vacuum pump later on.

The metal frame and flexible frame filled with the polyurethane material was enveloped in a plastic bag which was then heat sealed with a Heat Sealer Hospital HPS 400 available from Audion Elektro. The plastic bag consisted of VECAT® being a multilayered barrier film made from polyester and polyvinylidene chloride coated polyvinyl alcohol available from Fres-co System USA Inc.

Once the frames were properly enveloped a vacuum tight connection was fitted to the metal frame so that the whole system could be connected to a vacuum pump. When vacuum was applied the flexible frame, which has a lower density than the microvoid polyurethane material, was compressed more than the polyurethane material so that two reasonably flat sides were obtained. If the two sides were not perfectly flat and parallel to each other the whole system was put under an Instron and a load of 200 kg was applied to the sample (under vacuum) to make sure that the two sides were perfectly flat.

Sample thickness was preferably between 20 and 35 mm.

Lambda values of these samples at different vacuum levels were measured by using a Heat Flux meter type PU 4.3 supplied by TNO in Delft.

The sample, which was continuously pumped down using pressure controllers and vacuum pumps from Balzers, was put between a cold plate at −5° C. on one side and a Heat Flux meter and a hot plate at 25° C. on the other side. The temperature of the hot and cold plate was kept constant using heaters/coolers from Julabo. The whole measuring system was put into an insulated box to be sure that no heat was lost to the environment.

The heat flux through the sample was continuously measured and the lambda value calculated thereof.

Alternatively, the microvoid polyurethane material itself was heat sealed into a porous air permeable pouch, smoothed into a flat profile and lambda values measured in a purpose built vacuum chamber in which the hot and cold plates and flux meters were located.

By measuring lambda values at different pressures lambda value versus pressure curves were obtained.

This experiment was done with several samples prepared according to the different methods of the present invention.

As a comparison the experiment was also done for an evacuated insulation panel filled with a fine celled open celled polyurethane foam of density 50 to 60 kg/m$^3$ and cell size of about 80 micron (prepared as described in European Patent Publication No. 498628), referred to hereinafter as Comp sample.

Table 1 hereafter gives for each of these samples the lambda value (in mW/m° K.) at 10 mbar pressure and at 20 mbar pressure, the pressure (in mbar) at which a lambda value of 20 mW/m° K. was obtained, the pressure (in mbar) at which a lambda value of 15 mW/m° K. was obtained and the critical pressure (in mbar).

TABLE 1

| Sample | lambda 10 mbar | lambda 20 mbar | pressure for 20 mW/m °K. | pressure for 15 mW/m °K. | critical pressure |
|---|---|---|---|---|---|
| Comp | 26 | 28.5 | 3 | 1.2 | 0.1 |
| I.1 | 18.8 | 23.7 | 12.5 | 5.2 | 0.5 |
| I.2 | 19.7 | 23.5 | 11.5 | 5 | 1.0 |
| I.3 | 16 | 19.8 | 20 | 7.8 | 0.5 |
| I.4 | 14.8 | 18.3 | 27 | 10.5 | 1.0 |
| II.1 | 17.5 | 19.4 | 24 | 3 | 1.0 |
| II.2 | 13.3 | 15.8 | 61 | 18 | 0.8 |
| II.3 | 11.1 | 13.1 | 140 | 37 | 4.5 |
| II.4 | 14.7 | 17.2 | 44 | 10.5 | 1.7 |
| II.5 | 10.9 | 13.0 | >200 | 40 | 3.1 |
| III.1 | 18 | 20.8 | 16.5 | 0.1 | 4 |
| III.2 | 17.4 | 19.4 | 21 | 3.3 | 0.8 |
| IV.1 | 18.2 | 24 | 12 | 3.8 | 0.5 |
| V.1 | 13.5 | 16.4 | 37 | 15 | 1.5 |
| V.2 | 18 | 20.9 | 15 | 2.5 | 2.5 |

Figure 10A:
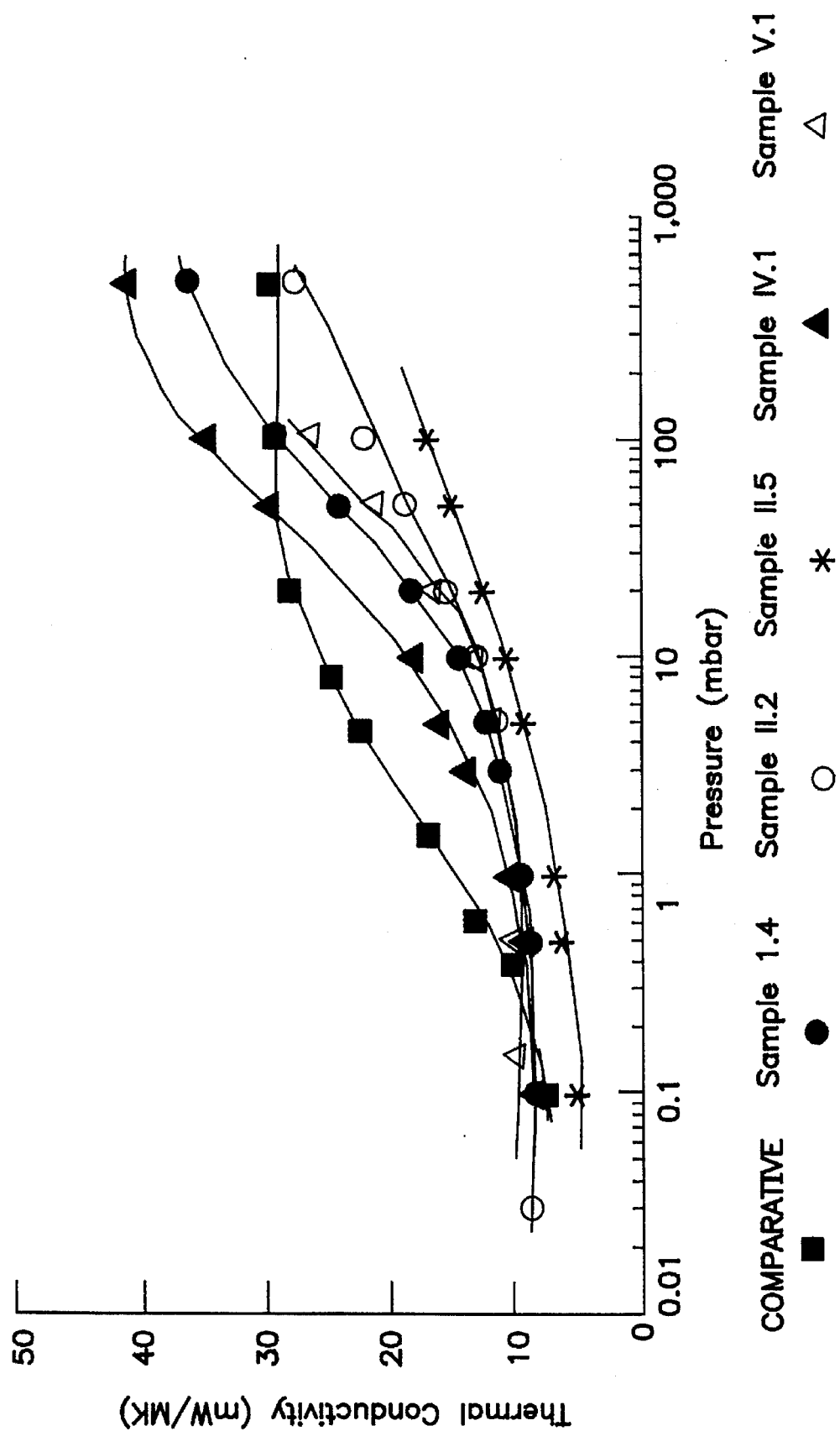
FIG. 10a shows lambda vs. pressure curves of samples I.4, II.2, IV.1 and V.1 and the comparative sample defined in the Examples.
Figure 10B:
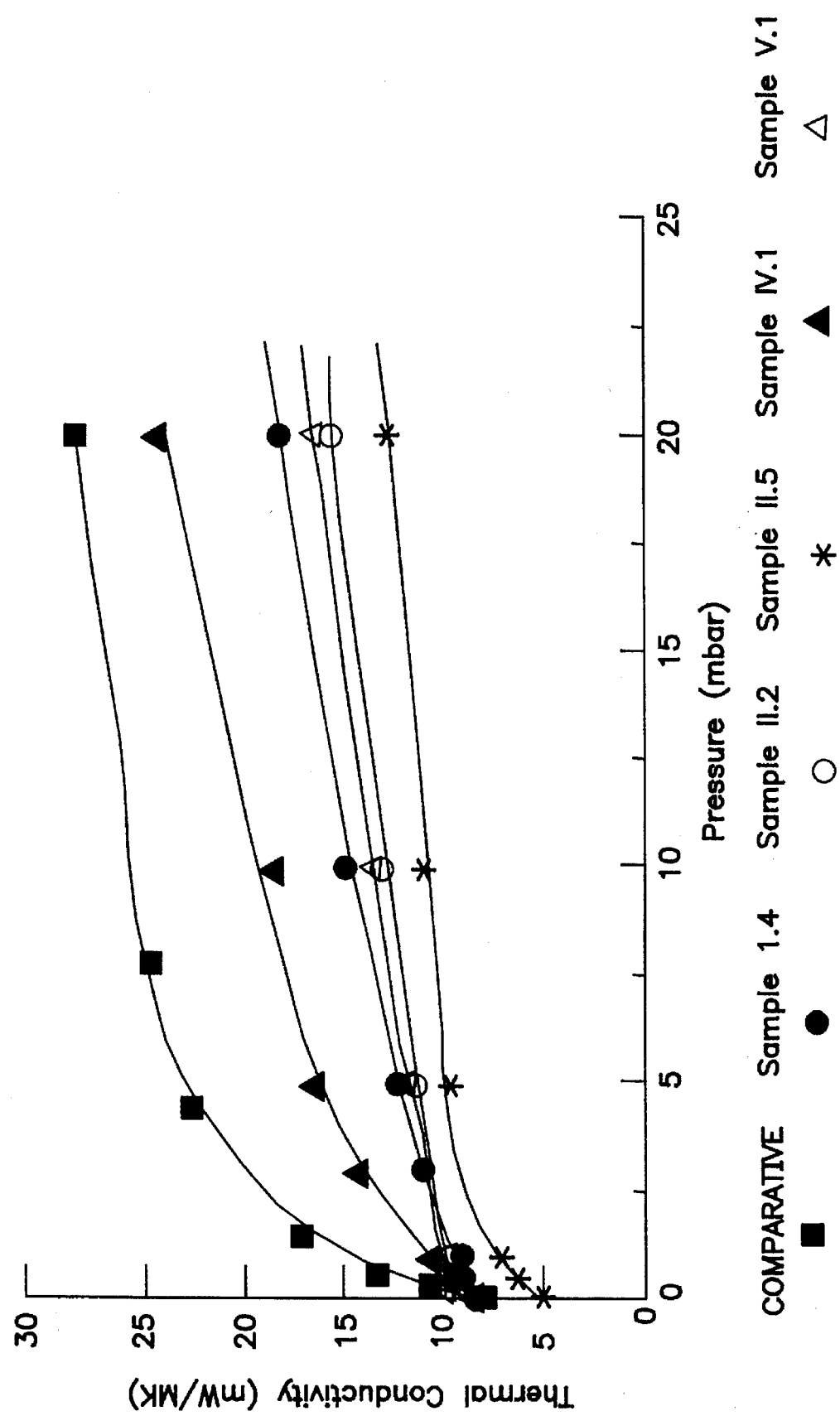

Further on FIG. 10a is presented the lambda versus pressure curves (log scale) for several of these samples, namely the comparative sample, sample I.4, sample II.2, sample II.5, sample IV.1 and sample V.1. An expansion of the 0–25 mbar region of these curves is presented as FIG. 10b.

EXAMPLE 7

Evacuated Insulation Panels

Evacuated insulation panels filled with mixtures of microvoid polyurethane materials according to the present invention and pyrogenic silica (type R 974 available from Degussa) were prepared as described in example 6 above.

Lambda values of these samples at different vacuum levels were measured. Results are recorded in table 2 hereinafter.

TABLE 2

| Filler | density filler (kg/m$^3$) | lambda at 10 mbar (mW/m °K.) | pressure for 10 mW/m °K. (mbar) | surface area filler (m$^2$/g) |
|---|---|---|---|---|
| Sample II.3 | 156 | 11 | 6.5 | 57 |
| Silica | 150 | 7.5 | 139 | 160 |
| II.3 (95%)/silica (5%) | 166 | 10.5 | 8.2 | |
| II.3 (90%)/silica (10%) | 165 | 10 | 10 | |
| II.3 (80%)/silica (20%) | 165 | 8.9 | 20 | |

We claim:

1. Microvoid polyurethane material having a mean void size of less than 5 micron yielding at a pressure of 10 mbar a thermal conductivity at 10° C. of at the most 23 mW/M° K., and having a density under vacuum of less than 200 kg/m$^3$.

2. Microvoid polyurethane material according to claim 1 yielding at a pressure of 10 mbar a thermal conductivity at 10° C. of at the most 15 mW/m° K.

3. Microvoid polyurethane material according to claim 1 yielding at a pressure of 20 mbar a thermal conductivity at 10° C. of at the most 27 mW/m° K.

4. Microvoid polyurethane material according to claim 3 yielding at a pressure of 20 mbar a thermal conductivity at 10° C. of at the most 18 mW/m° K.

5. Microvoid polyurethane material according to claim 1 yielding a critical pressure of above 0.1 mbar.

6. Microvoid polyurethane material according to claim 5 yielding a critical pressure of above 3 mbar.

7. Microvoid polyurethane material according to claim 1 having a surface area of above 1 m$^2$/g.

8. Microvoid polyurethane material according to claim 7 having a surface area of above 50 m$^2$/g.

* * * * *